US007674509B2

(12) United States Patent
Wu et al.

(10) Patent No.: US 7,674,509 B2
(45) **Date of Patent: *Mar. 9, 2010**

(54) TAPE-TYPE MAGNET

(76) Inventors: Hung-Chih Wu, No. 31, Lane 268, Hsin-shu Rd., Hsin-Chuang, Taipei County (TW); Chen-Liang Fan Chiang, No. 31, Lane 268, Hsin-shu Rd., Hsin-Chuang, Taipei County (TW)

(*) Notice: Subject to any disclaimer, the term of this patent is extended or adjusted under 35 U.S.C. 154(b) by 491 days.

This patent is subject to a terminal disclaimer.

(21) Appl. No.: 11/377,172

(22) Filed: Mar. 17, 2006

(65) Prior Publication Data

US 2007/0218234 A1 Sep. 20, 2007

(51) Int. Cl.
*B32B 9/00* (2006.01)
*B32B 33/00* (2006.01)
*B32B 7/12* (2006.01)

(52) U.S. Cl. ....................... 428/40.1; 428/42.1; 428/43; 428/343; 428/900; 428/906

(58) Field of Classification Search ................ 428/40.1, 428/42.1, 43, 900, 343, 906
See application file for complete search history.

(56) References Cited

U.S. PATENT DOCUMENTS 3,908,065 A 9/1975 Stigen
6,821,593 B2 * 11/2004 Maggio et al. ............. 428/40.1
6,986,953 B2 * 1/2006 Crum ....................... 428/692.1
2006/0172103 A1 * 8/2006 Chang ........................ 428/40.1
2007/0218234 A1 9/2007 Wu et al.
2007/0218235 A1 * 9/2007 Wu et al. ................... 428/40.1

FOREIGN PATENT DOCUMENTS

TW 253047 2/1993
TW 500126 7/2000
TW 262211 B 9/2006

* cited by examiner

*Primary Examiner*—Patricia L Nordmeyer
(74) *Attorney, Agent, or Firm*—Bacon & Thomas, PLLC

(57) ABSTRACT

A tape-type magnet including a soft magnetic substrate which is a thin strip or tape with magnetic attraction. A first adhesive layer is uniformly laid on one face of the magnetic substrate. A releasable facial layer is bonded with the other face of the magnetic substrate via a second adhesive layer. The adhesion provided by the second adhesive layer is greater than an adhesion provided by the first adhesive layer, whereby the releasable facial layer is releasable from the first adhesive layer. The magnetic substrate is wound into a roll with the second adhesive layer serving as an outer face and the first adhesive serving as an outer face and the first adhesive layer serving as an inner face. An outermost end of the magnetic substrate can be easily unwound and tore off into a segment.

12 Claims, 3 Drawing Sheets

TAPE-TYPE MAGNET

BACKGROUND OF THE INVENTION

The present invention is related to an improved tape-type magnet having at least one adhesive face for adhering to a surface of a predetermined article. By means of the magnetic attraction of the tape-type magnet, the article can attract and attach to a magnetic article.

Taiwanese Patent No. M253047 discloses a magnetic tape structure formed of a very thin tape-shaped soft magnetic substrate. A layer of releasable agent is laid on one face of the substrate, while an adhesive layer is laid on the other face of the substrate. The substrate is wound into a roll. One end of the roll of substrate can be unwound and torn off into a segment. The segment can be attached to a back face of an article. Then the article can attract a magnetic wall face or board face by means of magnetic attraction. The magnetic tape itself is made from microgranule of ferric oxide. In use, such microgranule tends to detach from the surface of the substrate. In addition, such microgranule makes it difficult to spray the releasable agent on the face of the substrate. This directly affects the manufacturing cost and practicability of the magnetic tape.

Taiwanese Patent Application No. 94108103 of this applicant discloses an improved magnetic tape structure and a manufacturing method thereof. High-performance releasable agent and property-changing agent are directly added into the soft magnetic material and evenly blended therewith. Then the mixture is molded into a tape the entire surface of which has releasable effect. Then one face of the tape is purified or roughened. Then an adhesive is overlaid on the treated face of the tape. Accordingly, the surface of the tape is not apt to peel off and the adhesion of the tape is enhanced. In addition, it is no more necessary to further spray any releasable agent onto the surface of the tape. Therefore, the working time and labor can be saved and a reliable and uniform releasable effect of the entire tape can be ensured. However, the complicated components of the tape also increases the manufacturing cost and the magnetism of the tape may be affected. In addition, before produced, the tape must go through some development and test procedures. These procedures necessitate considerable cost. In comparison with the conventional magnetic tape, the improved magnetic tape is not advantageous in economic efficiency.

SUMMARY OF THE INVENTION

It is therefore a primary object of the present invention to provide an improved tape-type magnet. The conventional tape-type magnet is made from microgranule of ferric oxide. The microgranule tends to detach from the surface of the conventional tape-type magnet. In addition, such microgranule makes it difficult to spray the releasable agent on the face of the conventional tape-type magnet. The improved tape-type magnet of the present invention has no such problems and the quality of the improved tape-type magnet of the present invention is ensured.

It is a further object of the present invention to provide the above improved tape-type magnet which has simplified components and stable quality. The cost for development of the improved tape-type magnet of the present invention is lowered.

According to the above objects, the tape-type magnet of the present invention includes a soft magnetic substrate which is a thin strip or tape with magnetic attraction. A first adhesive layer is uniformly laid on one face of the magnetic substrate. A releasable facial layer is bonded with the other face of the magnetic substrate via a second adhesive layer. The adhesion provided by the second adhesive layer is greater than an adhesion of the first adhesive layer, whereby the releasable facial layer is releasable from the first adhesive layer. The magnetic substrate is wound into a roll with the second adhesive layer serving as an outer face and the first adhesive servicing as an outer face and the first adhesive layer serving as an inner face. An outermost end of the magnetic substrate can be easily unwound and torn off into a segment.

The present invention can be best understood through the following description and accompanying drawings wherein:

DETAILED DESCRIPTION OF THE PREFERRED EMBODIMENTS

Figure 2:
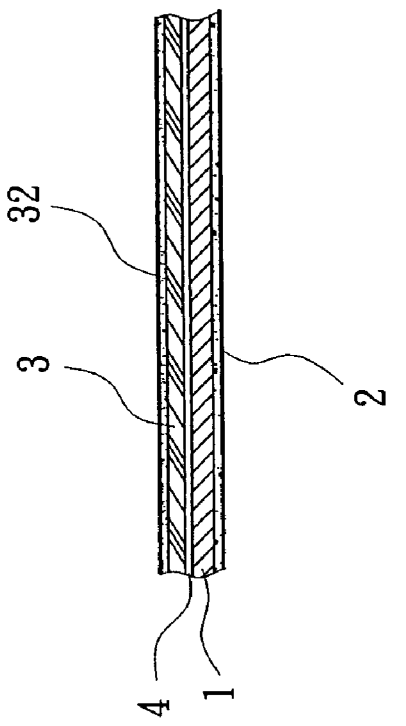
FIG. 2 is a sectional view of the first embodiment of the present invention.
Figure 1:
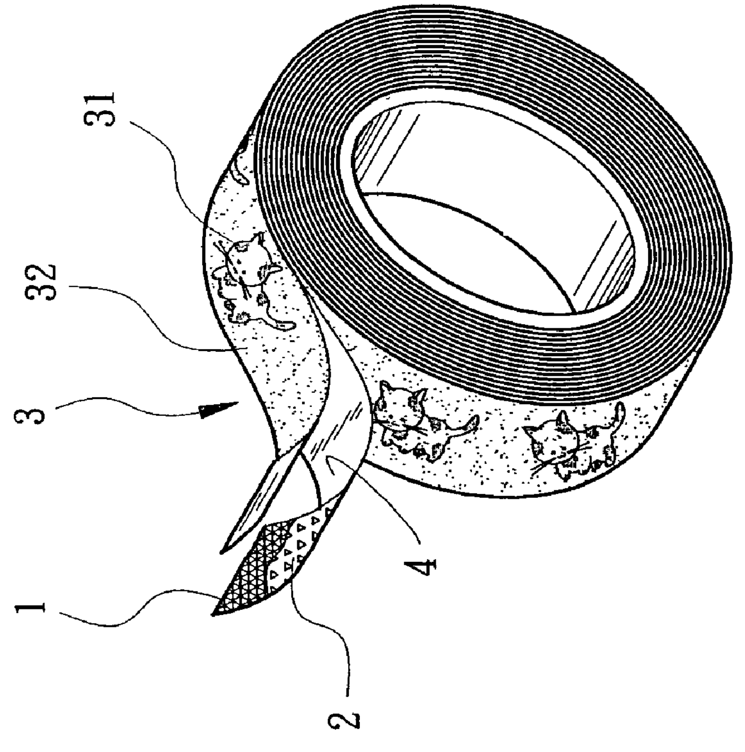
FIG. 1 is a perspective exploded view of a first embodiment of the present invention.
Figure 3:
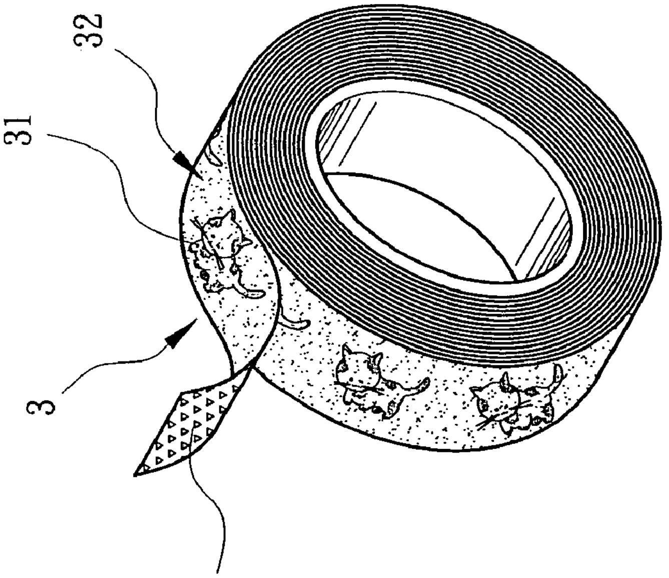
FIG. 3 is a perspective assembled view of the first embodiment of the present invention.

Please refer to FIGS. 1 to 3. According to a first embodiment the tape-type magnet of the present invention includes a very soft layer 3 and a second adhesive layer 4. The magnetic substrate 1 is soft strip or tape body with magnetic attraction. The first adhesive layer 2 is uniformly laid on one face of the magnetic substrate 1, while the second adhesive layer 4 is uniformly laid on the other face of the magnet substrate 1. The releasable facial layer 3 is bonded with the magnetic substrate 1 via the second adhesive layer 4. The adhesion between the releasable facial layer 3 and the magnetic substrate 1 is greater than the adhesion between the releasable facial layer 3 and the first adhesive layer 2. Thus, the adhesion provided by the second adhesive layer 4 is stronger than the adhesion provided by the first adhesive layer 2.

The magnetic substrate 1 is made from a mixture of plastic or rubber material and a magnetizable material and formed as a thin sheet. Then, the thin sheet is magnetized. In production procedure, the first and second adhesive layers 2, 4 are respectively laid on two faces of the thin sheet. In addition, a releasable facial layer 3 is strongly bonded with the second adhesive layer 4. Then the thin sheet is cut into strips which are wound into rolls by an automatic machine. In the winding procedure, the first adhesive layer 2 faces inward, while the releasable facial layer 3 faces outward.

The magnetic substrate 1 of the present invention pertains to prior art and has more stable quality. In contrast, Taiwanese Patent Application No. 94108103 discloses a magnetic tape structure in which releasable agent and property-changing agent are directly added into the soft magnetic material. This will affect the intensity of the magnetism and durability of the product. In addition, the complicated components of the tape lead to increment of cost for the material. Such magnetic tape is not advantageous in economic efficiency.

In use, the releasable facial layer 3 is releasable from the first adhesive layer 2. Therefore, the outermost end of the wound magnetic substrate 1 can be easily unwound and pulled out and cut off into a segment with a certain length. Then the first adhesive layer 2 can be adhered to an article or a plane face. By means of the magnetic attraction of the magnetic substrate 1 through the releasable facial layer 3, the article can mobilely attract and attach to a magnetic or magnetizable article or plane face.

Figure 4:
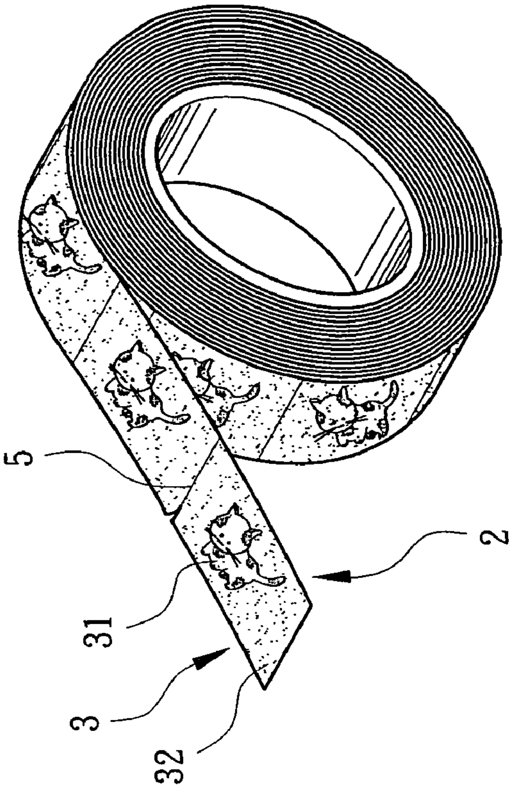
FIG. 4 is a perspective view of a second embodiment of the present invention.

FIG. 4 shows a second embodiment of the present invention, in which the magnetic substrate 1 is formed with multiple transverse tearing lines 5 at intervals. Each tearing line 5 is a dotted line composed of linearly arranged orifices or dents for a user to manually tear off the outermost section of the magnetic substrate 1 into a segment for use.

Figure 6:
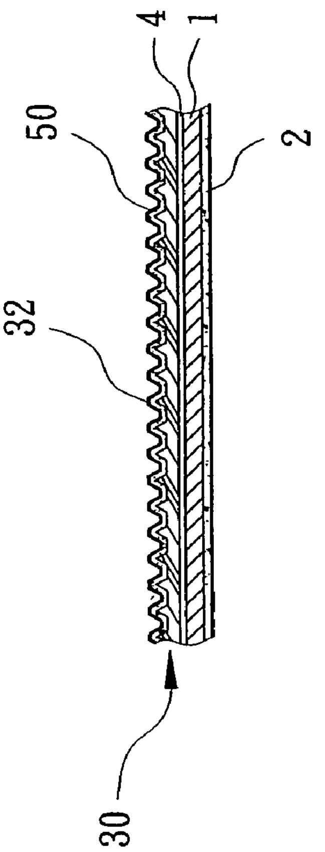
FIG. 6 is a sectional view of the third embodiment of the present invention.
Figure 5:
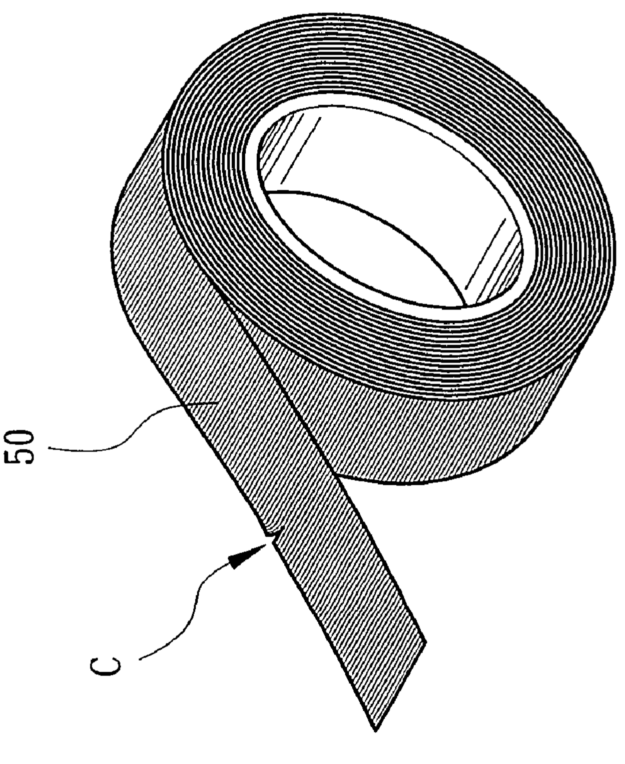
FIG. 5 is a perspective view of a third embodiment of the present invention.

FIGS. 5 and 6 show a third embodiment of the present invention, in which the surface of the releasable facial layer 30 is formed with densely and parallelly arranged linear grooves 50 for a user to easily manually tear off a part of the magnetic substrate 1 at section C to achieve a necessary length of segment of the magnetic tape.

The above embodiments are only used to illustrate the present invention, not intended to limit the scope thereof. Many modifications of the above embodiments can be made without departing from the spirit of the present invention.

What is claimed is:

1. A tape-type magnet for adhering to a first object such that the first object can be attached to a magnetically attractable second object, comprising a magnetic substrate which is a flexible thin strip or tape with magnetic attraction;

a first adhesive layer laid on one face of the magnetic substrate and adapted for adhering to the first object;

a thin releasable facial layer bonded with the other face of the magnetic substrate; and wherein, the releasable facial layer is bonded with the other face of the magnetic substrate via a second adhesive layer, the second adhesive layer providing an adhesion stronger than an adhesion of the first adhesive layer, whereby the releasable facial layer is releasable from the first adhesive layer, the magnetic substrate being wound into a roll with the second adhesive layer serving as an outer face and the first adhesive layer serving as an inner face, whereby an outermost end of the magnetic substrate can be easily unwound and torn off into a segment.

2. The tape-type magnet as claimed in claim 1, wherein the magnetic substrate is formed with multiple transverse tearing lines at predetermined intervals.

3. The tape-type magnet as claimed in claim 2, wherein each tearing line is a linear groove.

4. The tape-type magnet as claimed in claim 2, wherein each tearing line is a dotted line composed of linearly arranged orifices.

5. The tape-type magnet as claimed in claim 2, wherein each tearing line is a dotted line composed of linearly arranged dents.

6. The tape-type magnet as claimed in claim 2, wherein an outer surface of the releasable facial layer is printed with characters, figures or marks.

7. The tape-type magnet as claimed in claim 2, wherein a layer of releasable material is further laid on an outer surface of the releasable facial layer.

8. The tape-type magnet as claimed in claim 6, wherein a layer of releasable material is further laid on an outer surface of the releasable facial layer.

9. The tape-type magnet as claimed in claim 1, wherein an outer surface of the releasable facial layer is printed with characters, figures or marks.

10. The tape-type magnet as claimed in claim 9, wherein a layer of releasable material is further laid on an outer surface of the releasable facial layer.

11. The tape-type magnet as claimed in claim 1, wherein a layer of releasable material is further laid on an outer surface of the releasable facial layer.

12. The tape-type magnet as claimed in claim 1, wherein a surface of the releasable facial layer includes densely and parallelly arranged linear grooves configured to provide for manual tear off of a part of the magnetic substrate.

* * * * *